(12) United States Patent
Erofeev (10) Patent No.: US 8,572,719 B2
(45) Date of Patent: Oct. 29, 2013

(54) FIREWALL PROXY SYSTEMS AND METHODS IN A BACKUP ENVIRONMENT

(75) Inventor: Andrei Erofeev, Marlboro, NJ (US)

(73) Assignee: CommVault Systems, Inc., Oceanport, NJ (US)

( * ) Notice: Subject to any disclaimer, the term of this patent is extended or adjusted under 35 U.S.C. 154(b) by 216 days.

(21) Appl. No.: 13/118,169

(22) Filed: May 27, 2011

(65) Prior Publication Data

US 2011/0296520 A1 Dec. 1, 2011

Related U.S. Application Data

(60) Provisional application No. 61/349,704, filed on May 28, 2010.

(51) Int. Cl.
*G06F 9/00* (2006.01)

(52) U.S. Cl.
USPC ............... 726/14; 726/22; 713/151; 713/153; 713/193

(58) Field of Classification Search
None
See application file for complete search history.

(56) References Cited

U.S. PATENT DOCUMENTS

| | | |
|---|---|---|
| 4,084,231 A | 4/1978 | Capozzi et al. |
| 4,267,568 A | 5/1981 | Dechant et al. |
| 4,283,787 A | 8/1981 | Chambers |
| 4,417,321 A | 11/1983 | Chang et al. |
| 4,641,274 A | 2/1987 | Swank |
| 4,654,819 A | 3/1987 | Stiffler et al. |
| 4,686,620 A | 8/1987 | Ng |
| 4,912,637 A | 3/1990 | Sheedy et al. |
| 4,995,035 A | 2/1991 | Cole et al. |
| 5,005,122 A | 4/1991 | Griffin et al. |
| 5,093,912 A | 3/1992 | Dong et al. |

(Continued)

FOREIGN PATENT DOCUMENTS

| | | |
|---|---|---|
| AU | 2004227949 | 8/2010 |
| CA | 2498174 | 4/2010 |

(Continued)

OTHER PUBLICATIONS

Luis-Felipe Cabrera, et al. "ADSM: A Multi-Platform, Scalable, Backup and Archive Mass Storage System", Digest of Papers of the Computer Society Computer Conference (Spring) Compeon, US, Los Alamitos, IEEE Comp. Soc. Press, vol. Conf. (Mar. 5, 1995), pp. 420-427.

(Continued)

*Primary Examiner* — Shewaye Gelagay
(74) *Attorney, Agent, or Firm* — Knobbe Martens Olson & Bear LLP (57) ABSTRACT

According to certain aspects, a method for performing remote backup operations is provided that includes receiving a first unidirectional connection request from a media agent module to a proxy device within an enterprise network, through a firewall. The method also includes receiving a second unidirectional connection request from a remote device coupled to an untrusted network, such as through a second firewall. Secure connections are established from the media agent module to the proxy and from the remote device to the proxy. Additionally, the method can include routing with the proxy device backup data from the remote computing device to the media agent over the secured connections. The method also may include storing the backup data on a storage device within the enterprise network. In certain embodiments, during establishment of the secure connections, identification of the media agent or the storage device is not exposed to the untrusted network.

18 Claims, 3 Drawing Sheets

(56) References Cited

U.S. PATENT DOCUMENTS

| | | | |
|---|---|---|---|
| 5,133,065 | A | 7/1992 | Cheffetz et al. |
| 5,193,154 | A | 3/1993 | Kitajima et al. |
| 5,212,772 | A | 5/1993 | Masters |
| 5,226,157 | A | 7/1993 | Nakano et al. |
| 5,239,647 | A | 8/1993 | Anglin et al. |
| 5,241,668 | A | 8/1993 | Eastridge et al. |
| 5,241,670 | A | 8/1993 | Eastridge et al. |
| 5,276,860 | A | 1/1994 | Fortier et al. |
| 5,276,867 | A | 1/1994 | Kenley et al. |
| 5,287,500 | A | 2/1994 | Stoppani, Jr. |
| 5,301,286 | A | 4/1994 | Rajani |
| 5,321,816 | A | 6/1994 | Rogan et al. |
| 5,347,653 | A | 9/1994 | Flynn et al. |
| 5,410,700 | A | 4/1995 | Fecteau et al. |
| 5,420,996 | A | 5/1995 | Aoyagi |
| 5,454,099 | A | 9/1995 | Myers et al. |
| 5,559,991 | A | 9/1996 | Kanfi |
| 5,642,496 | A | 6/1997 | Kanfi |
| 6,418,478 | B1 | 7/2002 | Ignatius et al. |
| 6,542,972 | B2 | 4/2003 | Ignatius et al. |
| 6,658,436 | B2 | 12/2003 | Oshinsky et al. |
| 6,721,767 | B2 | 4/2004 | De Meno et al. |
| 6,760,723 | B2 | 7/2004 | Oshinsky et al. |
| 7,003,641 | B2 | 2/2006 | Prahlad et al. |
| 7,035,880 | B1 | 4/2006 | Crescenti et al. |
| 7,130,970 | B2 | 10/2006 | Devassy et al. |
| 7,162,496 | B2 | 1/2007 | Amarendran et al. |
| 7,174,433 | B2 | 2/2007 | Kottomtharayil et al. |
| 7,209,972 | B1 | 4/2007 | Ignatius et al. |
| 7,246,207 | B2 | 7/2007 | Kottomtharayil et al. |
| 7,315,923 | B2 | 1/2008 | Retnamma et al. |
| 7,315,924 | B2 | 1/2008 | Prahlad et al. |
| 7,380,072 | B2 | 5/2008 | Kottomtharayil et al. |
| 7,389,311 | B1 | 6/2008 | Crescenti et al. |
| 7,395,282 | B1 | 7/2008 | Crescenti et al. |
| 7,401,154 | B2 | 7/2008 | Ignatius et al. |
| 7,409,509 | B2 | 8/2008 | Devassy et al. |
| 7,440,982 | B2 | 10/2008 | Lu |
| 7,447,692 | B2 | 11/2008 | Oshinsky et al. |
| 7,454,569 | B2 | 11/2008 | Kavuri et al. |
| 7,484,054 | B2 | 1/2009 | Kottomtharayil et al. |
| 7,490,207 | B2 | 2/2009 | Amarendran et al. |
| 7,500,053 | B1 | 3/2009 | Kavuri et al. |
| 7,536,291 | B1 | 5/2009 | Retnamma et al. |
| 7,543,125 | B2 | 6/2009 | Gokhale |
| 7,546,324 | B2 | 6/2009 | Prahlad et al. |
| 7,581,077 | B2 | 8/2009 | Ignatius et al. |
| 7,603,386 | B2 | 10/2009 | Amarendran et al. |
| 7,606,844 | B2 | 10/2009 | Kottomtharayil |
| 7,613,748 | B2 | 11/2009 | Brockway et al. |
| 7,613,752 | B2 | 11/2009 | Prahlad et al. |
| 7,617,253 | B2 | 11/2009 | Prahlad et al. |
| 7,617,262 | B2 | 11/2009 | Prahlad et al. |
| 7,620,710 | B2 | 11/2009 | Kottomtharayil et al. |
| 7,636,743 | B2 | 12/2009 | Erofeev |
| 7,651,593 | B2 | 1/2010 | Prahlad et al. |
| 7,657,550 | B2 | 2/2010 | Prahlad et al. |
| 7,660,807 | B2 | 2/2010 | Prahlad et al. |
| 7,661,028 | B2 | 2/2010 | Erofeev |
| 7,739,459 | B2 | 6/2010 | Kottomtharayil et al. |
| 7,747,579 | B2 | 6/2010 | Prahlad et al. |
| 7,757,043 | B2 | 7/2010 | Kavuri et al. |
| 7,769,961 | B2 | 8/2010 | Kottomtharayil et al. |
| 7,801,864 | B2 | 9/2010 | Prahlad et al. |
| 7,802,067 | B2 | 9/2010 | Prahlad et al. |
| 7,809,914 | B2 | 10/2010 | Kottomtharayil et al. |
| 2005/0039051 | A1* | 2/2005 | Erofeev ............ 713/201 |
| 2009/0064307 | A1* | 3/2009 | Holar et al. ............ 726/12 |

FOREIGN PATENT DOCUMENTS

| | | |
|---|---|---|
| DE | 69415115 | 9/1998 |
| DE | 60020978.4 | 6/2005 |
| EP | 0259912 | 3/1988 |
| EP | 0405926 | 1/1991 |
| EP | 0467546 | 1/1992 |
| EP | 0645709 | 9/1994 |
| EP | 0774715 | 5/1997 |
| EP | 0809184 | 11/1997 |
| EP | 541281 | 4/1998 |
| EP | 0899662 | 3/1999 |
| EP | 0981090 | 2/2000 |
| EP | 1204922 | 7/2000 |
| EP | 1393181 | 1/2001 |
| EP | 1384135 | 7/2010 |
| GB | 2410106 | 9/2006 |
| GB | 2409553 | 4/2007 |
| GB | 2425199 | 8/2007 |
| GB | 2435756 | 12/2008 |
| GB | 2447361 | 5/2009 |
| IN | 226655 | 12/2008 |
| IN | 234083 | 5/2009 |
| IN | 234518 | 6/2009 |
| JP | 4198050 | 10/2008 |
| JP | 4267443 | 2/2009 |
| MX | 254554 | 2/2008 |
| WO | WO 9513580 | 5/1995 |
| WO | WO 9912098 | 3/1999 |

OTHER PUBLICATIONS

Mendel Rosenblum Operating Systems Review (SIGOPS), vol. 25, No. 5, May 1991, New York, US, "The Design and Implementation of a Log-Structured File System", p. 4, paragraph 3.3—p. 5.

IBM Technical Disclosure Bulletin, vol. 24, No. 5, Oct. 1981 New York, US, pp. 2404-2406, K.L. Huff, "Data Set Usage Sequence Number".

David A. Arneson, "Mass Storage Archiving in Network Environments"; IEEE; Oct. 31-Nov. 1988; pp. 45-80.

Eitel, "Backup and Storage Management in Distributed Heterogenerous Environments", IEEE, 1994, pp. 124-126.

\* cited by examiner

FIREWALL PROXY SYSTEMS AND METHODS IN A BACKUP ENVIRONMENT

CROSS-REFERENCE TO RELATED APPLICATION

This application claims the benefit of priority under 35 U.S.C. §119(e) of U.S. Provisional Patent Application No. 61/349,704, filed on May 28, 2010, and entitled "FIREWALL PROXY SYSTEMS AND METHODS IN A BACKUP ENVIRONMENT," the disclosure of which is hereby incorporated by reference in its entirety.

BACKGROUND

1. Field

The present disclosure relates to performing storage operations and, in particular, systems and methods for backing up data from computing devices located outside an enterprise network.

2. Description of the Related Art

Computers have become an integral part of business operations such that many banks, insurance companies, brokerage firms, financial service providers, and a variety of other businesses rely on computer networks to store, manipulate, and display information that is constantly subject to change. Oftentimes, the success or failure of an important transaction may turn on the availability of information that is both accurate and current. Accordingly, businesses worldwide recognize the commercial value of their data and seek reliable, cost-effective ways to protect the information stored on their computer networks.

Moreover, an increasing number of people and businesses are turning to laptops and other portable computing devices to access and manipulate business data. The portability of these computing devices enables individuals to work from home and other remote locations, such as hotels, airports or public restaurants. Oftentimes, such users back up their data to an external device, such as a portable hard drive, a thumb drive, or the like. Some service providers further provide space for online storage of data.

However, attempting to back up data to the individual's corporate network can pose several problems in that enterprise network firewalls or the firewalls at remote network access points can limit communication and/or the set of protocol available to or from the respective networks. Moreover, it can be undesirable to open ports on the enterprise network firewalls to expose identification information, such as internet protocol (IP) addresses, of internal devices to outside the enterprise network. In addition, the portable computing devices can have constantly changing IP addresses that make it difficult to establish connections requested by backup servers, such as an enterprise backup server within the corporate or enterprise network.

SUMMARY

In view of the foregoing, a need exists for improved systems and methods for backing up data on computing devices that are located outside an enterprise network. In particular, there is a need for the ability to perform secure backup operations between a remote computing device and an enterprise backup system without exposing IP address information of internal enterprise backup components to untrusted networks and/or the remote computing device.

In certain embodiments, systems and methods are disclosed herein for accepting network connections both from within an enterprise network and through an external network, authenticating such connections, and dispatching network traffic by routing packets from one connection to the other. For example, in certain embodiments, a dedicated proxy device within a demilitarized zone (DMZ) can be used to accept each of the network connections in order to back up data from a portable device located outside an enterprise network.

For example, certain embodiments of the invention provide connectivity and enable data protection operations in a dual-firewall topology wherein a remote computing device nor a backup provider's internal network are exposed to connections from the Internet.

According to certain aspects, a method for performing remote backup operations is provided. The method can include receiving with a proxy computing device a first unidirectional connection request from a media agent module within an enterprise network. The first unidirectional connection request may be received through a first firewall. The method can further include receiving with the proxy computing device a second unidirectional connection request from a remote computing device coupled to an untrusted network. For example, the second unidirectional connection request can be received through a second firewall coupled to the untrusted network. In certain embodiments, the method also includes unidirectionally establishing a first secure connection from the media agent module to the proxy computing device in response to said receiving the first unidirectional connection request. The method may include unidirectionally establishing a second secure connection from the remote computing device to the proxy computing device in response to said receiving the second unidirectional connection request. Additionally, the method can include routing with the proxy computing device backup data received from the remote computing device via the first secure connection to the media agent module over the second secure connection. The method also may include storing the backup data on at least one storage device within the enterprise network. In certain embodiments, during establishing said first and second secure connections identification of the media agent module or the at least one storage device is not exposed to the untrusted network.

According to further aspects of the disclosure, a system for performing remote backup operations is provided. The system comprises an enterprise network including at least one storage device, a media agent module configured to direct backup operations with respect to the at least one storage device. The enterprise network may further include a first firewall component in communication with the media agent module and configured to prevent connection requests to the media agent module from outside the enterprise network. The system can further include a second firewall component located outside the enterprise network and configured to receive communication from an untrusted network. In certain cases, the system includes a proxy computing device located outside the enterprise network and coupled to the first firewall component and the second firewall component. The proxy computing device may be configured to: receive through the second firewall component a first connection request from a remote computing device coupled to the untrusted network; establish a first secure connection with the remote computing device in response to said receiving the first connection request; receive through the first firewall component a second connection request from the media agent module; establish a second secure connection with the media agent module in response to said receiving the second connection request; and route backup data received from the remote computing device via the first secure connection to the media agent module over the second secure connection. Additionally, the media agent module can be configured to direct the backup data to the at least one storage device.

According to yet other embodiments, a system is provided for performing remote backup operations. The system can comprise an enterprise network including means for storing data, means for directing backup operations with respect to said storing means, and means for preventing connection requests to said directing means from outside the enterprise network. The system can also include means for restricting communication between the enterprise network and an untrusted network. In certain cases, the system includes means for receiving through said restricting means a first connection request from a remote computing device coupled to the untrusted network and for receiving through said preventing means a second connection request from said directing means. The receiving means can further be configured to: establish a first secure connection with the remote computing device in response to receiving the first connection request; establish a second secure connection said directing means in response to receiving the second connection request; and route backup data received from the remote computing device via the first secure connection to said directing means over the second secure connection. In some embodiments, the directing means is further configured to store the backup data on said storing means.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

DETAILED DESCRIPTION OF THE PREFERRED EMBODIMENTS

As will be seen from the disclosure herein, systems and methods are provided for performing backup operations on data of remote computing devices. For instance, inventive embodiments allow for the backup of data on a roaming computing device, such as laptop, that is located remote to an enterprise network to back up data to storage devices within the enterprise network while, at the same time, protecting devices within the enterprise network from unwanted traffic (e.g., not exposing identification information of the internal corporate computing devices to the untrusted network).

In certain embodiments, a proxy machine is provided in a DMZ zone for facilitating the backup systems and methods described above. For example, such a configuration can require both the remote computing device and the internal corporate network devices to first connect to the proxy machine to establish the needed backup tunnel connections. The proxy device then multiplexes the appropriate connections so that backup of data from the remote device(s) to the internal corporate storage devices can take place. This advantageously results in a secure environment for the enterprise network in that no connections to devices within the enterprise network are established from outside the network (e.g., through an untrusted network).

The features of the systems and methods will now be described with reference to the drawings summarized above. Throughout the drawings, reference numbers are re-used to indicate correspondence between referenced elements. The drawings, associated descriptions, and specific implementation are provided to illustrate embodiments of the invention and not to limit the scope of the disclosure.

In addition, methods and functions described herein are not limited to any particular sequence, and the blocks or states relating thereto can be performed in other sequences that are appropriate. For example, described blocks or states may be performed in an order other than that specifically disclosed, or multiple blocks or states may be combined into a single block or state.

Figure 1:
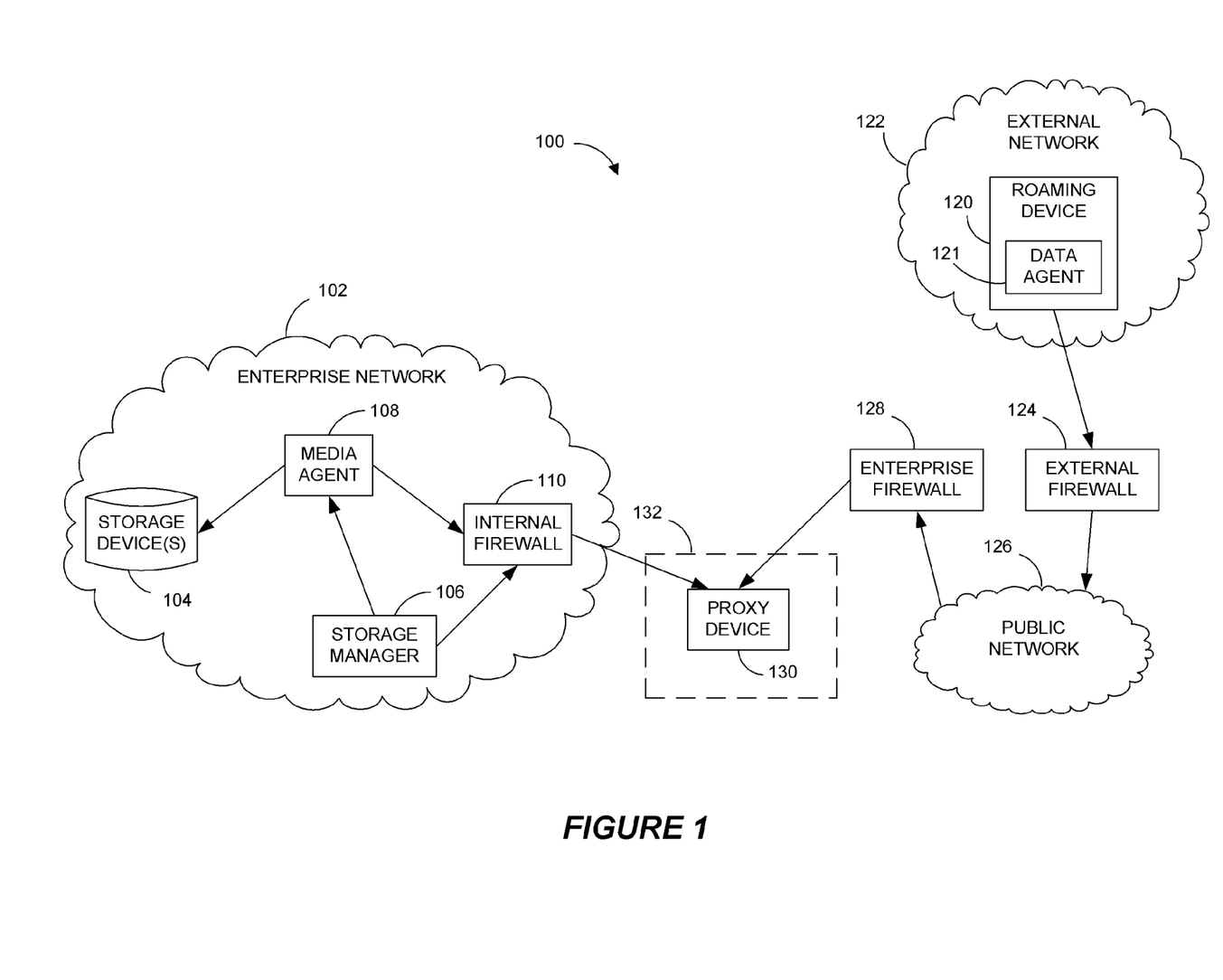
FIG. 1 illustrates a block diagram of a data backup system, according to certain embodiments of the invention.

FIG. 1 illustrates a block diagram of an exemplary data backup system 100, according to certain embodiments of the invention. In certain embodiments, the backup system 100 advantageously provides for the backup of data from a remote or roaming computing device to a storage location within a corporate or enterprise network without exposing confidential information (internet protocol (IP) address) of the corporate servers to untrusted networks.

As shown, the data backup system 100 comprises a corporate or enterprise network 102 that includes one or more storage devices 104 for storing data. In certain embodiments, the storage device(s) 104 are configured to store backup or archive data or the like and can include any type of physical media capable of storing electronic data. For example, the storage device(s) 104 can comprise magnetic storage, such as a disk or a tape drive, or other type of mass storage.

In yet other embodiments, the storage device(s) 104 can include a network attached storage ("NAS") or a storage area network ("SAN"). In certain embodiments, the storage device(s) 104 may be implemented as one or more storage "volumes" that include physical storage disks defining an overall logical arrangement of storage space. For instance, disks within a particular volume may be organized as one or more groups of redundant arrays of independent (or inexpensive) disks (RAID). In certain embodiments, storage devices 104 may include multiple storage devices of the same or different media.

As shown, the enterprise network 102 further comprises a storage manager 106 and a media agent 108 that coordinate storage of data on the storage device(s) 104. In certain embodiments, the storage manager 106 directs storage operations within the enterprise network 102. For instance, the storage manager 106 can access index data to indicate, track, and associate logical relationships and associations between components of the system, user preferences, management tasks, and other useful data. For example, the storage manager 106 may utilize an index cache to track logical associations between media agent 108 and storage device(s) 104. The storage manager 106 may also track the status of storage operations to be performed, storage patterns associated with the system components such as media use, storage growth, network bandwidth, Service Level Agreement ("SLA") compliance levels, data protection levels, storage policy information, storage criteria associated with user preferences, retention criteria, storage operation preferences, and other storage-related information.

In certain embodiments, the media agent 108 comprises a module that conducts data, as directed by the storage manager 106, between one or more clients and the storage device(s) 104. The media agent 108 may be communicatively coupled with and generally configured to control one or more storage devices 104. For example, the media agent 108 may instruct the storage device 104 to use a robotic arm or other means to load or remove a media cartridge, and to archive, migrate, or restore application-specific data. The media agent 108 may generally communicate with storage devices 104 via a local bus such as a SCSI adaptor. In some embodiments, the storage device 104 may be communicatively coupled to the media agent 108 via a SAN.

Each media agent 108 may also maintain an index cache that stores index data the system generates during storage operations. Such index data may include, for example, information regarding the location of the stored data on a particular media, information regarding the content of the data stored such as file names, sizes, creation dates, formats, application types, and other file-related criteria, information regarding one or more clients associated with the data stored, information regarding one or more storage policies, storage criteria, or storage preferences associated with the data stored, compression information, retention-related information, encryption-related information, stream-related information, and other types of information. Index data may thus provide the system with an efficient mechanism for performing storage operations, including locating user files for recovery operations and for managing and tracking stored data.

Additional details of embodiments of modular backup systems usable within the enterprise network 102 are described in U.S. Pat. No. 7,035,880, issued Apr. 25, 2006, U.S. Pat. No. 6,542,972, issued Apr. 1, 2003, and U.S. Pat. No. 7,246,207, issued Jul. 17, 2007, each of which is hereby incorporated herein by reference in its entirety.

Each of the storage device(s) 104, storage manager 106 and media agent 108 is advantageously located behind an internal firewall 110. In certain embodiments, the internal firewall 110 protects the enterprise network devices from unauthorized access from outside the enterprise network 102 while allowing for authorized communications. For example, the internal firewall 110 can be implemented in either hardware and/or software. In certain embodiments, the internal firewall 110 can apply one or more security criteria and/or policies to incoming and/or outgoing communications based on information stored in the storage manager 106. In particular, in certain embodiments, the internal firewall 110 is configured to allow outgoing traffic while substantially limiting the types of traffic into the enterprise network 102. For example, the internal firewall 110 may substantially prohibit certain types of traffic into the enterprise network 102, or in some cases may substantially prohibit all types of traffic into the enterprise network.

The data backup system 100 further includes a roaming device 120. In certain embodiments, the roaming device 120 comprises a portable computing device for executing one or more software applications that interact with a user to process data and may include, for example, database applications (e.g., SQL applications), word processors, spreadsheets, financial applications, management applications, e-commerce applications, browsers, combinations of the same or the like. In certain embodiments, the roaming device 120 is configured to access and/or manipulate data available on the enterprise network 102, such as stored on the storage device(s) 104. In certain embodiments, the roaming device 120 comprises a laptop, notebook, a personal digital assistant (PDA), a smart phone, a personal computer, a handheld computing device or the like.

As shown, the roaming device 120 comprises a data agent 121 that prepares data on the roaming device 120 for backup. In certain embodiments, the data agent 121 comprises a file system data agent executing on the roaming device 120 for extracting and transmitting data to be backed up based on one or more policies and/or user preferences.

In certain embodiments, the data agent 121 can comprise a software module or part of a software module that is generally responsible for copying, archiving, migrating, and recovering application-specific data from the roaming device 120. For example, embodiments of the invention may employ multiple data agents 121, each of which may backup, migrate, and recover data associated with a different application. For instance, different individual data agents 121 may be designed to handle MICROSOFT EXCHANGE data, LOTUS NOTES data, and other types of data. Other embodiments may employ one or more generic data agents 121 that can handle and process multiple data types. The data agent 121 may be further responsible for arranging or packing data into a particular backup format and/or encapsulating the data according to a specific protocol.

In certain embodiments, the roaming computing device 120 communicates with other components of the data backup system 100 through at least an external network 122. For instance, the external network 122 can comprise a wireless local area network (e.g., WI-FI network) available in a local public or private venue, such as a hotel, a restaurant, an airport or the like. To protect the external network 122, all inbound and outbound traffic to and from the external network 122 can be routed though an external firewall 124 coupled to a public network 126, such as the Internet.

In certain embodiments, the public network 126 comprises an untrusted computer network that spans a large geographic area (e.g., a wide area network (WAN)). In yet other embodiments, the public network 126 can comprise a token ring or TCP/IP based network, a local area network (LAN), an intranet network, a wireless network, a cellular network, a wireless data transmission system, a two-way cable system, an interactive kiosk network, a satellite network, combinations of the same or the like.

As illustrated, the enterprise network 102 also communicates with the public network 126 through an enterprise firewall 128 and a proxy device 130. In certain embodiments, the proxy device 130 comprises a server computer located within a DMZ or perimeter network 132 located between the enterprise network 102 and the enterprise firewall 128. For instance, the DMZ can comprise a physical or logical subnetwork that contains and exposes select portions of an organization's external services to the public network 126 or other untrusted network.

Like the internal firewall 110, the enterprise firewall 128 can be configured to provide protection to the enterprise network 102 and/or proxy device 130 from unauthorized communication from the public network 120. In certain preferred embodiments, the enterprise firewall 128 is configured to limit communication therethrough to HTTPs communication (e.g., via port 443).

In certain embodiments, the enterprise firewall 128 is implemented on a computing device separate from the proxy device 130. In yet other embodiments, the enterprise firewall 128 can be integrated into the proxy device 130.

Although the data backup system 100 has been described with respect to particular arrangements, other embodiments of the invention may comprise alternative configurations than those described above. For instance, the enterprise network 102 can comprise multiple media agents 108 and/or storage managers 106 that communicate with one or more roaming devices 120. Moreover, it will be appreciated that the roaming device 120 is not confined to a single enterprise network 122 and may move between various network access points, each of which can be associated with a different IP address, in communication with the public network 126.

Figure 2:
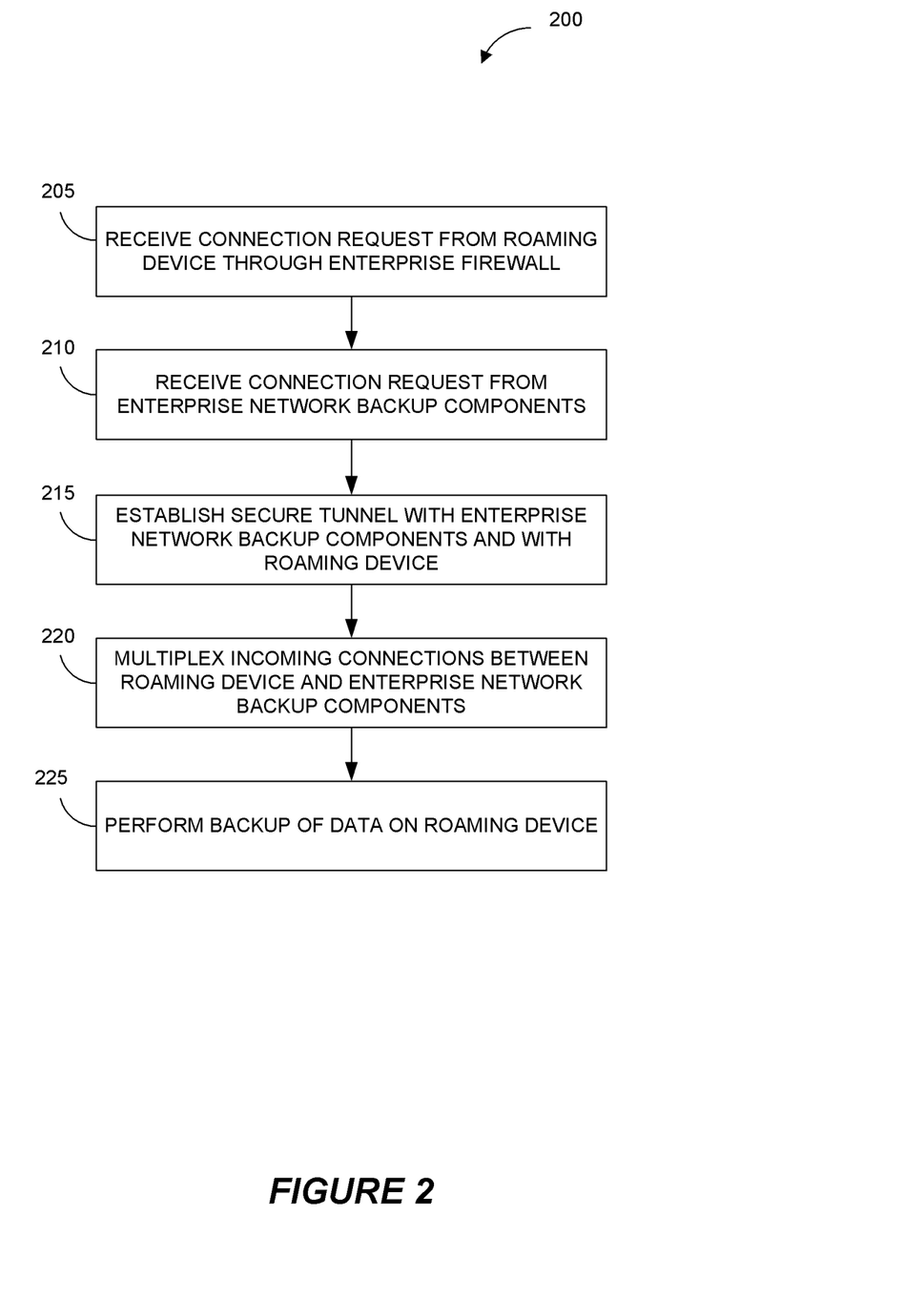
FIG. 2 illustrates a flowchart of an exemplary embodiment of a remote backup process usable by the data backup system of FIG. 1.

One example of a remote backup process 200 that can be performed in the data backup system 100 is illustrated in FIG. 2. In particular, the remote backup process 200 enables running backups of data on a portable computing device, such roaming device 120, to storage device(s) 104 within the enterprise network 120. For instance, the remote device 120 can be part of an external network coupled to the Internet. Moreover, such a backup process can be performed even when the external network and/or the enterprise network containing the storage devices include firewalls that prohibit certain types of incoming traffic. For exemplary purposes, the backup process 200 will be described with reference to the components of the data backup system 100 of FIG. 1.

At Block 205, the process 200 receives a request to back up data from the roaming device 120 to the enterprise network 102. For instance, such a request could be based on a request from the user and/or on one or more predetermined storage policies. In certain embodiments, the roaming device 120 communicates the backup request to the proxy device 130. In certain embodiments, this backup request and subsequent communication with the proxy device 130 are advantageously wrapped using hypertext transfer protocol secure (HTTPs) to enable communication via the public network 126. Moreover, HTTPs provides a further advantage to facilitate communication through the external firewall 124, which can oftentimes limit the set of protocol that are available on the associated external network 122 (e.g., a traffic-sensing firewall that analyzes and/or filters traffic that does not look like HTTP).

At Block 210, the process 200 receives a connection request from at least one enterprise network backup component. For instance, in certain embodiments, the proxy device 130 can receive a connection request from the media agent 108. For example, the request may be in the form of SSL certificate authentication over an HTTPs tunnel. While the process 200 is described as incorporating HTTPs and/or SSL certificates, other types of compatible communication protocols may be used. For example, in some other embodiments authentication is based on a Hash-based Message Authentication Code (HMAC). In one such embodiment, communications are not encrypted, and an HMAC-MD5 scheme is used, or some other type of challenge-response scheme is used.

At Block 215, the proxy device 130 authenticates and/or establishes secure communication tunnels with each of the roaming device 120 and the media agent 108. Thus, in certain embodiments, the secure communication is via HTTPs. As can be seen, each of the communication connections is established in a unidirectional manner from the roaming device 120 and the media agent 108 to the proxy device 130. In certain embodiments, connections are not initiated in the opposite direction (i.e., originating from the proxy device 130), such as being prevented by the firewalls.

At Block 220, once the incoming connections are established, the proxy device 130 multiplexes the connections such that backup data being sent from the roaming device 120 to the proxy device 130 is routed to the appropriate media agent 108 within the enterprise network 102. At Block 225, the backup of the data from the roaming device 120 is performed by the media agent 108 and storage device 104.

Although the process 200 has been described with reference to a backup using a single media agent and storage manager, other embodiments of the invention can utilize multiple media agents and/or storage managers using the systems and methods disclosed herein. For instance, the network configuration of the data backup system 100 allows for multiple media agents and/or storage managers to be made available through the single proxy device 130 with just one external IP address.

Figure 3:
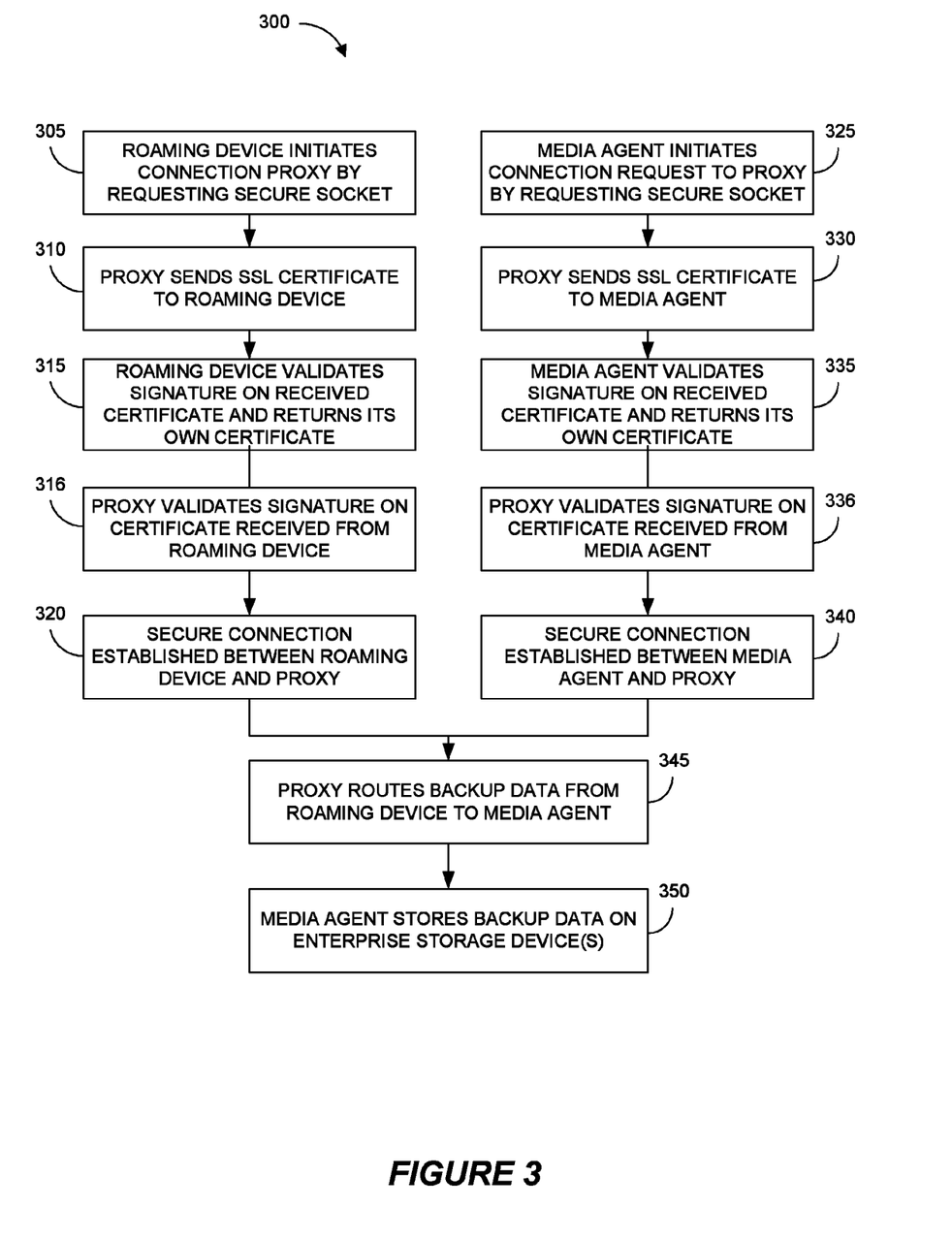
FIG. 3 illustrates a flowchart of an embodiment of a remote backup process usable by the data backup system of FIG. 1.

FIG. 3 illustrates a flowchart of an embodiment of a remote backup process 300 usable with embodiments of the invention. In general, the backup process 300 provides for the backup of data located on a remote (offsite) machine over an untrusted network. For exemplary purposes, the backup process 300 will be described with reference to the components of the data backup system 100 of FIG. 1. Moreover, it will be understood that the process 300 can generally follow the steps of the backup process 200. Thus, details provided with respect to the backup process 200 that also apply to the process 300 may not be repeated with respect to FIG. 3.

As illustrated in FIG. 3, a first branch of the process 300 (i.e., Blocks 305, 310, 315 and 320) relates to establishing a secure connection between the roaming device 120 and the proxy device 130. In particular, Block 305 begins with the roaming device 120 initiating a connection with the proxy device 130. For example, the roaming device 120 may request a secure socket. In certain embodiments, the IP address of the proxy device 130 is exposed to the outside world and known to the roaming device 120. In certain embodiments, the request is made via communication on port 443. In certain embodiments where HTTPs/SSL is being used, both the roaming device 120 and the proxy device 130 transmit their own certificate to the other party. Transmitted certificates are expected to be signed by a mutually recognized certificate known to every party. This mutually recognized certificate may be of a Certificate Authority (CA), for example, or other trusted third party. In some embodiments, the CA certificate may be specific to a particular data backup system, storage operation cell (e.g., CommCell), or the like, and is delivered to the corresponding clients or other appropriate entities.

Thus, at Block 310, the proxy device responds to the request by transmitting its SSL certificate to the roaming device 120. In certain further embodiments, the proxy device 130 may comprise a list or other identification of roaming computing devices authorized to complete backup operations using the proxy device 130.

At Block 315, the roaming device 120 validates the proxy's certificate and responds to the proxy device 130 by transmitting credentials along with the roaming device's SSL certificate. At block 316, the proxy then validates the signature on the roaming device's 120 certificate. The roaming device 120 and proxy 130 then engage in secure communication, e.g., by negotiating a one-time session key using a public key found in each other's certificate.

In yet other embodiments, the roaming device 120 can transmit other authentication and/or encryption information to the proxy device in order to establish a secure communications link with the proxy device 130. For example, in some other embodiments authentication is based on a Hash-based Message Authentication Code (HMAC), such as HMAC-MD5.

At Block 320, the secure connection between the roaming device 120 and the proxy device 130 is established. As discussed, in certain embodiments, this connection can comprise an HTTPs connection over an untrusted network, such as the Internet. Moreover, because the transmissions are encapsulated in HTTPs headers, the communication can be performed through various types of firewalls (e.g., the enterprise firewall 128 and the external firewall 124 of the external network 122) and untrusted networks while maintaining security of the communication.

As shown, the process 300 also includes a second branch (i.e., Blocks 325, 330, 335 and 340) related to establishing a secure connection between the media agent 108, or other enterprise network backup component, and the proxy device 130. In certain embodiments, one or more of the blocks of the second branch can be executed prior to, concurrently with, and/or after blocks of the first branch of the process 300.

In particular, Blocks 325, 330, 335, 336 and 340 can follow a similar approach as the first branch to establish a secure connection between the media agent 108 and the proxy device 130. In certain embodiments, establishing the connection comprises the use of SSL certificates that have been generated by the storage manager 106. Moreover, the communication can advantageously be encapsulated in HTTPs headers, allowing for transmission through the internal firewall 110. In this configuration, however, the IP addresses of the media agent 108 and/or storage manager 106 are not exposed to the components outside the enterprise firewall 128.

In yet other embodiments, one or more backup components of the enterprise network 102 and the proxy device 1300 can exchange other types of authentication and/or encryption information in order to establish a secure communications link. For example, in some other embodiments authentication is based on a Hash-based Message Authentication Code (HMAC), such as HMAC-MD5.

At Block 345, the proxy device 130 multiplexes together incoming connections from the roaming device 120 and the media agent 108 by routing traffic between the components. In certain embodiments, the network connections of the backup services are conducted through the tunnel connections established by the proxy device 130. For instance, the proxy device 130 can receive backup data extracted by the data agent 121 on the roaming device 120 and route the backup data to the appropriate media agent 108 within the enterprise network 102.

In certain embodiments, the proxy device 130 appears to the roaming device 120 to function as the media agent 108 and/or appears to the media agent 108 to function as the roaming device 120. For instance, the proxy device 130 can assume the identity of the roaming device 120 in communicating with the media agent 108. In certain embodiments, the proxy device 130 can be installed with one or more data agents that facilitate the preparation and backup of data received from the roaming device 120 for backup to the enterprise network 102. In other embodiments, the proxy device 130 does not assume the identity of the roaming device 120, media agent 108. Rather, the proxy device 130 functions namely as a proxy and the various system components are aware of this.

In certain embodiments, the storage manager 106 maintains a list, index or the like, of roaming devices 120 that are approved for performing backup of data to the storage device(s) 104. For instance, the storage manager 106 may identify approved roaming devices via a unique name, Media Access Control (MAC) address, string or other like identifier. In certain further embodiments, the proxy device 130 is provided a copy of these identifications in order to authenticate roaming device(s) 120 requesting connection therewith.

At Block 350, the media agent 108 stores the received backup data on the storage device(s) 104, as received from the proxy device 130. In further embodiments, the media agent 108 may forward information to the proxy device 130 to inform the roaming device 120 of details regarding the storage of the backup data.

It will be appreciated that the backup process 300 is described with reference to certain implementations and that other embodiments of the invention can perform backup operations with different configurations than those described above. For example, in other embodiments of the invention, the process 300 can use other types of communication protocol and/or authentication platforms for establishing and maintaining connections between the proxy device 130 and either of the media agent 108 or the roaming device 120.

In some embodiments including one or more proxy devices 130, the system 100 is configurable to perform network throttling. For example, a user can configure a throttling group and throttling schedule for any component of the network, including the proxy device 130. As just a couple examples, schedules can impose day and/or time limitations on send and receive throughput. The cumulative traffic to and from remote computers from the throttling group can be measured against the pre-configured limits. Moreover, the available bandwidth can be divided (e.g., equally) between members of the group which are communicating with one another. Systems including a proxy device 130 are particularly suited to such a network throttling framework because in some such proxy setups substantially all of the backup traffic passes through the proxy device 130. Thus, the combined backup throughput can be measured by monitoring the traffic passing through the proxy device 130. This monitoring ability enables the system 100 to prevent the backup traffic from interfering with other communications, such as communications between corporate and global networks.

In certain embodiments of the invention, disclosed data backup systems may be part of a storage operation cell that includes combinations of hardware and software components directed to performing storage operations on electronic data. Exemplary storage operation cells usable with embodiments of the invention include CommCells as embodied in the QNet storage management system and the QINETIX or SIMPANA storage management systems offered by CommVault Systems, Inc. (Oceanport, N.J.), and as further described in U.S. Pat. No. 7,454,569, issued Nov. 18, 2008, which is hereby incorporated herein by reference in its entirety.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser, or via other means suitable for the purposes described herein. Data structures or indexes described herein may comprise computer files, variables, programming arrays, programming structures, or any electronic information storage schemes or methods, or any combinations thereof, suitable for the purposes described herein.

Embodiments of the invention are also described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the acts specified in the flowchart and/or block diagram block or blocks.

These computer program instructions may also be stored in a computer-readable memory that can direct a computer or other programmable data processing apparatus to operate in a particular manner, such that the instructions stored in the computer-readable memory produce an article of manufacture including instruction means which implement the acts specified in the flowchart and/or block diagram block or blocks. The computer program instructions may also be loaded onto a computer or other programmable data processing apparatus to cause a series of operations to be performed on the computer or other programmable apparatus to produce a computer implemented process such that the instructions which execute on the computer or other programmable apparatus provide means for implementing the acts specified in the flowchart and/or block diagram block or blocks.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method for performing remote backup operations, the method comprising:
   receiving with a proxy computing device a first unidirectional connection request from a media agent module that resides within a trusted enterprise network, the first unidirectional connection request being received through a first firewall;
   receiving with the proxy computing device a second unidirectional connection request from a remote computing device coupled to an untrusted network, the second unidirectional connection request being received through a second firewall coupled to the untrusted network, the proxy computing device having a data agent executing thereon that is configured to facilitate the backup of backup data received from the remote computing device;
   unidirectionally establishing a first secure connection from the media agent module to the proxy computing device in response to said receiving the first unidirectional connection request;
   unidirectionally establishing a second secure connection from the remote computing device to the proxy computing device in response to said receiving the second unidirectional connection request;
   routing with the proxy computing device backup data received from the remote computing device via the first secure connection to the media agent module over the second secure connection; and
   with the media agent module, and at the direction of the storage manager module, storing the backup data on at least one storage device within the enterprise network, wherein during establishing said first and second secure connections identification of the media agent module or the at least one storage device is not exposed to the untrusted network.

2. The method of claim 1, wherein said establishing the first secure connection comprises exchanging a secure sockets layer (SSL) certificate.

3. The method of claim 1, wherein the second firewall is located between the untrusted network and the proxy computing device.

4. The method of claim 1, further comprising receiving the second unidirectional connection request through a third firewall coupled between the remote computing device and the untrusted network.

5. The method of claim 1, further comprising routing with the proxy computing device second backup data received from a second remote computing device to a second media agent module within the enterprise network.

6. The method of claim 5, further comprising providing a same Internet Protocol (IP) address from the proxy computing device to the first and second remote computing devices.

7. The method of claim 1, wherein at least one of the first and second secure connections comprises a hypertext transfer protocol secure (HTTPs) tunnel.

8. A system for performing remote backup operations, the system comprising:
   an enterprise network comprising,
      at least one storage device,
      a media agent module configured to direct backup operations with respect to the at least one storage device, and
      a first firewall component in communication with the media agent module and configured to prevent connection requests to the media agent module from outside the enterprise network;
   a second firewall component located outside the enterprise network and configured to receive communication from an untrusted network;
   a proxy computing device located outside the enterprise network and coupled to the first firewall component and the second firewall component, wherein the proxy computing device is configured to,
      receive through the second firewall component a first connection request from a remote computing device coupled to the untrusted network, the proxy computing device having a data agent executing thereon that is configured to facilitate the backup of backup data received from the remote computing device,
      establish a first secure connection with the remote computing device in response to said receiving the first connection request,
      receive through the first firewall component a second connection request from the media agent module,
      establish a second secure connection with the media agent module in response to said receiving the second connection request, and
      route backup data received from the remote computing device via the first secure connection to the media agent module over the second secure connection,
   and wherein the media agent module is configured to direct the backup data to the at least one storage device.

9. The system of claim 8, wherein the enterprise network further comprises a storage manager component configured to maintain at least one policy for managing storage of the backup data.

10. The system of claim 8, wherein the storage manager is configured to generate at least one certificate to authenticate the media agent module to the proxy computing device.

11. The system of claim 8, wherein the untrusted network comprises the Internet.

12. The system of claim 8, wherein the first secure connection comprises a hypertext transfer protocol secure (HTTPs) tunnel.

13. The system of claim 8, further comprising a third firewall component coupled between the remote computing device and the untrusted network.

14. The system of claim 13, wherein the third firewall component prevents initial connection requests from the untrusted network to the remote computing device.

15. The system of claim 8, wherein the second firewall component is implemented on the proxy computing device.

16. The system of claim 8, wherein the proxy computing device prevents exposure of an Internet Protocol (IP) address of the media agent module to the untrusted network.

17. A system for performing remote backup operations, the system comprising:
   an enterprise network comprising,
      means for storing data,
      means for directing backup operations with respect to said storing means, and
      means for preventing connection requests to said directing means from outside the enterprise network;
   means for restricting communication between the enterprise network and an untrusted network;
   means for receiving through said restricting means a first connection request from a remote computing device coupled to the untrusted network and for receiving through said preventing means a second connection request from said directing means, wherein said receiving means is further configured to,
      establish a first secure connection with the remote computing device in response to receiving the first connection request, the receiving means comprising a proxy computing device having a data agent executing thereon that is configured to facilitate the backup of backup data received from the remote computing device,
      establish a second secure connection said directing means in response to receiving the second connection request, and
      route backup data received from the remote computing device via the first secure connection to said directing means over the second secure connection,
   and wherein said directing means is further configured to store the backup data on said storing means.

18. The system of claim 17, wherein at least one of the first and second secure connections comprises a hypertext transfer protocol secure (HTTPs) tunnel.

* * * * *